(12) United States Patent
Blue et al.

(10) Patent No.: US 11,932,112 B1
(45) Date of Patent: Mar. 19, 2024

(54) VEHICLE AND CORRESPONDING POWERTRAIN CONTROL SYSTEM

(71) Applicant: FORD GLOBAL TECHNOLOGIES, LLC, Dearborn, MI (US)

(72) Inventors: Corey James Blue, Belleville, MI (US); Samuel Melville Glauber, McLean, VA (US); Timothy Baxendale, Portales, NM (US); Bradley D Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/312,007

(22) Filed: May 4, 2023

(51) Int. Cl.
*B60W 20/40* (2016.01)
*B60K 6/387* (2007.10)

(52) U.S. Cl.
CPC ............. *B60K 6/387* (2013.01); *B60W 20/40* (2013.01); *B60W 2510/0275* (2013.01); *B60W 2710/083* (2013.01)

(58) Field of Classification Search
CPC .................. B60K 6/387; B60W 20/40; B60W 2510/0275; B60W 2710/083; B60W 10/02; B60W 10/06; B60W 10/08
See application file for complete search history.

(56) References Cited

U.S. PATENT DOCUMENTS

| 8,715,136 | B1 | 5/2014 | Dai et al. |
| 9,669,824 | B2 | 6/2017 | Thompson et al. |
| 9,688,268 | B2 * | 6/2017 | Johri ..................... B60W 10/08 |
| 10,393,259 | B2 | 8/2019 | Meyer et al. |
| 10,704,618 | B2 | 7/2020 | Johri et al. |
| 11,473,544 | B2 | 10/2022 | Baxendale et al. |
| 2012/0083952 | A1 | 4/2012 | Smith et al. |

FOREIGN PATENT DOCUMENTS

CN          111002971 A  *  4/2020

* cited by examiner

*Primary Examiner* — Sherry L Estremsky
(74) *Attorney, Agent, or Firm* — Vincent Mastrogiacomo; Brooks Kushman. P.C.

(57) ABSTRACT

A vehicle includes an engine, an electric machine, a clutch, and a controller. The clutch is disposed between the engine and the electric machine. The controller is programmed to, in response to an engine start, close the clutch to transfer power from the electric machine to the engine to start the engine. The controller is further programmed to, in response to the engine start, control a torque capacity of the clutch during the engine start according to a model of a pressure applied to the clutch. The controller is further programmed to, in response to the engine start, control the torque of the electric machine based on an adjusted torque capacity of the clutch.

20 Claims, 3 Drawing Sheets

VEHICLE AND CORRESPONDING POWERTRAIN CONTROL SYSTEM

TECHNICAL FIELD

The present disclosure relates to vehicles and corresponding powertrain control systems.

BACKGROUND

Vehicles may include powertrain control systems that are configured control the power output of the vehicle powertrain.

SUMMARY

A vehicle includes a powertrain, a disconnect clutch, and a controller. The powertrain has an engine and an electric machine that are each configured to generate power to propel the vehicle. The disconnect clutch is disposed between the engine and the electric machine. The disconnect clutch is configured to open to disconnect the engine from a remainder of the powertrain. The disconnect clutch is configured to close to connect the engine to the remainder of the powertrain. The controller is programmed to, in response to a command to start the engine, close the disconnect clutch to transfer power from the electric machine to the engine to start the engine. The controller is further programmed to, in response to the command to start the engine, control a torque capacity of the disconnect clutch during the engine start according to a feedforward model of a pressure applied to the disconnect clutch. The controller is further programmed to, in response to the command to start the engine, control the torque of the electric machine based on an adjusted torque capacity of the disconnect clutch in response to (i) the pressure applied to the disconnect clutch decreasing according to a ramp down phase during the engine start, (ii) a difference between (a) the pressure applied to the disconnect clutch according to the feedforward model and (b) a measured pressure of the disconnect clutch increasing to greater than a first threshold, and (iii) a rate of change of the pressure applied to the disconnect clutch decreasing to less than a second threshold. The adjusted torque capacity of the disconnect clutch is based on the feedforward model of the pressure applied to the disconnect clutch and an offset value.

A vehicle includes an engine, an electric machine, a clutch, and a controller. The engine and the electric machine are each configured to generate power to propel the vehicle. The clutch is disposed between the engine and the electric machine. The controller is programmed to, in response to an engine start, close the clutch to transfer power from the electric machine to the engine to start the engine. The controller is further programmed to, in response to the engine start, control a torque capacity of the clutch during the engine start according to a model of a pressure applied to the clutch. The controller is further programmed to, in response to the engine start, control the torque of the electric machine based on an adjusted torque capacity of the clutch in response to (i) the pressure applied to the clutch decreasing according to a ramp down phase during the engine start and (ii) a difference between (a) the pressure applied to the clutch according to the model and (b) a measured pressure of the clutch increasing to greater than a threshold. The adjusted torque capacity of the clutch is based on the model of the pressure applied to the clutch and an offset value.

A vehicle includes an engine, and electric machine, a clutch, and a controller. The engine and the electric machine are each configured to generate power to propel the vehicle. The clutch is disposed between the engine and the electric machine. The controller is programmed to, in response to an engine start, close the clutch to transfer power from the electric machine to the engine to start the engine. The controller is further programmed to, in response to the engine start, control a torque capacity of the clutch during the engine start according to a model of a pressure applied to the clutch. The controller is further programmed to, in response to the engine start, control the torque of the electric machine based on an adjusted torque capacity of the clutch in response to (i) the pressure applied to the clutch decreasing according to the ramp down phase during the engine start and (ii) a rate of change of the pressure applied to the clutch decreasing to less than a threshold. The adjusted torque capacity of the clutch is based on the model of the pressure applied to the clutch and an offset value.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
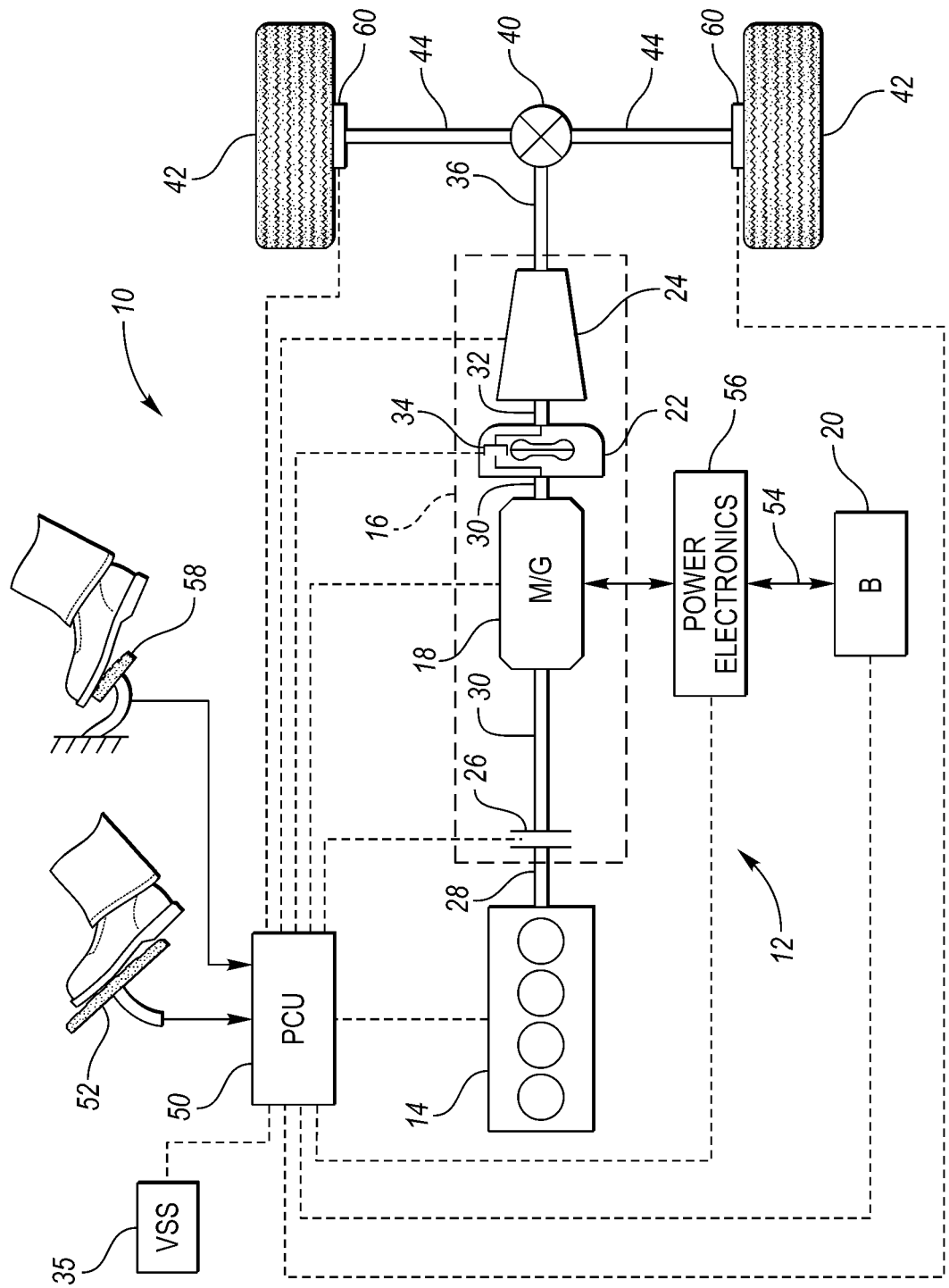
FIG. 1 is a schematic illustration of an exemplary powertrain of a hybrid vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 and the M/G 18 may each be referred to as powerplants that are configured to generate power to propel the vehicle 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The wheels 42 may be referred to as drive wheels that are driven by the powerplants (e.g., engine 14 and M/G 18) of the vehicle 10 via power that is transferred from the powerplants, through the subcomponents of the powertrain (e.g., torque converter 22, gearbox 24, shaft 36, differential 40, half shafts 44, etc.) to the drive wheels 42.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS) 35, coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component amount or presence, intake air flow (MAF), transmission gear, ratio, or mode, transmission oil temperature (TOT), transmission turbine speed (TS), torque converter bypass clutch 34 status (TCC), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other hybrid vehicle configurations should be construed as disclosed herein. Other vehicle configurations may include, but are not limited to, series hybrid vehicles, parallel hybrid vehicles, series-parallel hybrid vehicles, or any other vehicle configuration known to a person of ordinary skill in the art.

The disconnect clutch 26 may be used to disconnect or connect the engine 14, and as a starting device for the engine 14. During such an engine start and connect process, the disconnect clutch 26 torque capacity is controlled to crank and connect the engine 14 to the remainder of the powertrain 12 with a modulated pressure and capacity profile. A fast response along with accurate and precise delivery and estimation of disconnect clutch 26 torque capacity is desired for coordinating the control of the disconnect clutch 26 and the M/G 18 to meet drivability and responsiveness requirements (e.g., smooth and fast torque and speed profiles). The controls for the disconnect clutch 26 and the M/G 18 may be handled by separate control modules or controllers, even though only one controller is illustrated (e.g., PCU 50), which may result in a delay in one or more control signals between the separate control modules or controllers. For example, there may be a 30-40 millisecond controller area network (CAN) delay between the separate control modules or controllers.

When applying the disconnect clutch 26, the predicted torque capacity of the disconnect clutch 26 must be communicated accurately to the control module or controller that is controlling the M/G 18. When the disconnect clutch 26 enters a state of falling pressure during a clutch engagement at the end of a cranking stage of an engine start, a true current torque capacity of the disconnect clutch 26 signal my result in the control module or controller that is controlling the M/G 18 believing that the disconnect clutch 26 is overcapacity due to the CAN delay in the signal that is representative of the torque capacity of the disconnect clutch 26, which may cause the control module or controller that is controlling the M/G 18 to take unnecessary or undesired corrective action. This could lead to undesired impeller speed acceleration making it difficult to control the last portion of the engagement of the disconnect clutch 26, which may affect drivability.

Figure 2:
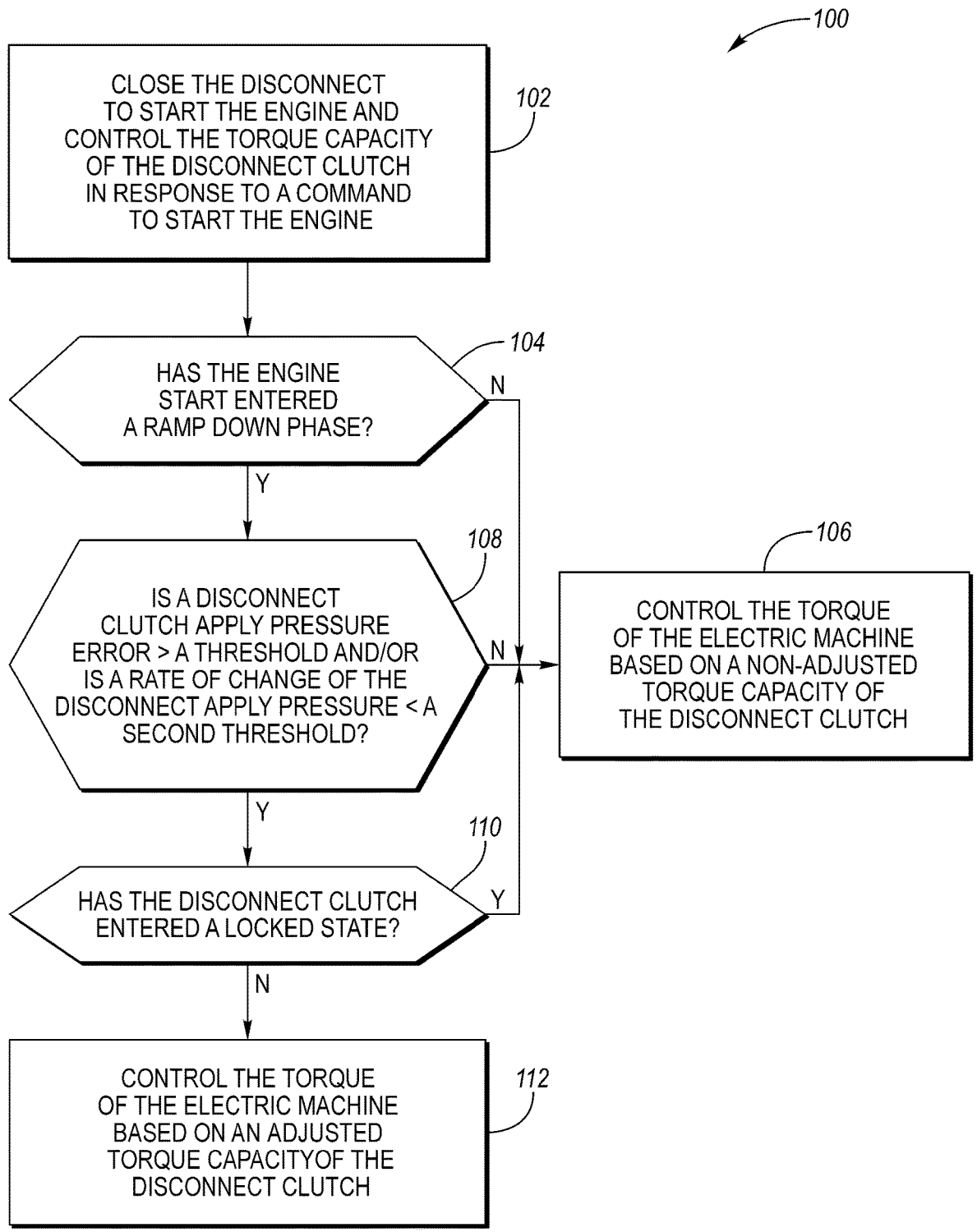
FIG. 2 is a flowchart illustrating a method for controlling the torque of the electric machine during an engine start.
Figure 3:
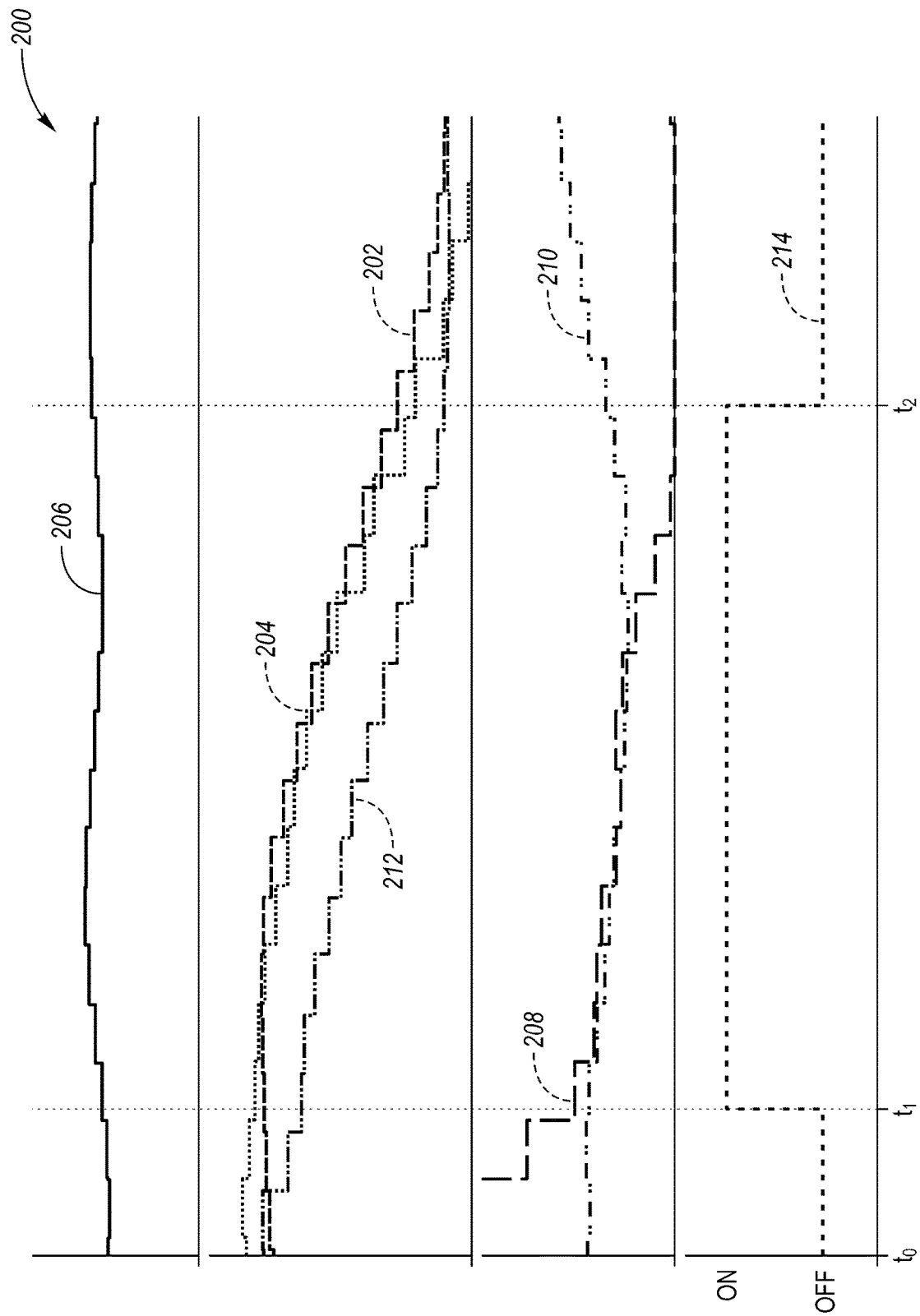
FIG. 3 is a series of graphs illustrating an error and an offset adjustment for a torque capacity signal of an engine disconnect clutch during the engine start.

Referring to FIGS. 2 and 3, a flowchart illustrating a method 100 for controlling the torque of the electric machine (e.g., M/G 18) during an engine start and a series of graphs 200 illustrating an error and an offset adjustment for a torque capacity signal of an engine disconnect clutch (e.g., disconnect clutch 26) during the engine start. The method 100 and graphs 200 may be stored as control logic and/or an algorithm within one or more controllers (e.g., the PCU 50, separate controllers or control modules that control the disconnect clutch 26 and the M/G 18, etc.). The controller or controllers may implement the method 100 by controlling the various components of the vehicle 10. The method 100 begins at block 102 where the disconnect clutch 26 is closed to transfer power and torque from the M/G 18 to the engine 14 to start the engine 14 in response to a command to the start the engine 14. Such a command to start the engine 14 may result from an increase in torque demand where the M/G 18 alone cannot supply the desired torque demand, a transition to an engine only operating mode, a low battery charge requiring recharging of the battery 20, etc.

Also at block 102, the torque capacity of the disconnect clutch 26 is controlled during the engine start according to a feedforward model of a pressure applied to the disconnect clutch 26. Such a pressure applied to the disconnect clutch 26 may be a hydraulic pressure applied to a piston that forces the opposing sides of the disconnect clutch 26 into contact with each other. A transfer function, a linear function, exponential function, look up tables, etc. may correlate the values of the feedforward model of the pressure applied to the disconnect clutch 26 to values of the torque capacity of the disconnect clutch 26. The feedforward model of a pressure applied to the disconnect clutch 26 is represented by line 202 in FIG. 3. A measured value of the pressure applied to the disconnect clutch 26 is represented by line 204 in FIG. 3.

Next, the method 100 moves on to block 104, where it is determined if the engine start has entered into a ramp down or falling phase. Such a ramp down or falling phase corresponds to a later or end stage of the engine starting process, where the engine 14 is beginning to produce torque and the need to transfer torque from the M/G 18 to the engine 14 begins decrease. Also, during such a ramp down phase the increase in the ability of the disconnect clutch 26 to transfer torque from the M/G 18 to the engine 14 is no longer required. Therefore, the torque capacity of the disconnect clutch 26 is reduced, which is reflected in the decrease of both the feedforward model 202 and the measured value 204 of the pressure applied to the disconnect clutch 26 starting at or approximately at time to in FIG. 3.

If the engine start has not entered into the ramp down or falling phase (e.g., before the ramp down phase or before time to), the method 100 moves on to block 106 where the torque of the M/G 18 is controlled based on a non-adjusted torque capacity of the disconnect clutch 26. For example, the signal of the non-adjusted torque capacity of the disconnect clutch 26, which is relayed from the control module or controller responsible for operating the disconnect clutch 26 to the control module or controller responsible for operating the M/G 18, may correspond to the torque capacity of the disconnect clutch 26 that is based on the feedforward model of the pressure applied to the disconnect clutch 26 (e.g., line 202) and not an offset value. Such an offset value that is excluded from the non-adjusted torque capacity is discussed in further detail below.

The M/G 18 is then controlled based on this non-adjusted torque capacity of the disconnect clutch 26 to prevent an undesired or unexpected impeller speed acceleration (e.g., an acceleration of shaft 30). For example, the M/G 18 may be controlled based on the non-adjusted torque capacity of the disconnect clutch 26 by limiting a commanded torque to the M/G 18 to the non-adjusted torque capacity of the disconnect clutch 26 or to an offset value that is less than the non-adjusted torque capacity of the disconnect clutch 26. The impeller speed is illustrated as line 206 in FIG. 3.

If the engine start has entered into the ramp down or falling phase, the method 100 moves on to block 108 where it is determined if a disconnect apply pressure error is greater than a first threshold and/or if a rate of change of the disconnect clutch pressure is less than second threshold. The disconnect apply pressure error being greater than the first threshold may correspond to the disconnect apply pressure error increasing to greater than the first threshold while the disconnect apply pressure error being less than the first threshold (i.e., not greater than the first threshold) may correspond to the disconnect apply pressure error decreasing to less than the first threshold. The rate of change of the disconnect clutch pressure being less than the second threshold may correspond to the rate of change of the disconnect clutch pressure decreasing to less than the second threshold while the rate of change of the disconnect clutch pressure being greater than the second threshold (i.e., not less than the second threshold) may correspond to the rate of change of the disconnect clutch pressure increasing to greater than the second threshold.

The second threshold may be a negative value and the rate of change of the disconnect clutch pressure being less than the second threshold may correspond the rate of change of the disconnect clutch pressure exceeding the second threshold in absolute value while the rate of change of the disconnect clutch pressure being greater than the second threshold may correspond the rate of change of the disconnect clutch pressure being less than the second threshold in absolute value.

It is noted that block 108 may require only one of the two conditions or may require both conditions. For example, block 108 may be rewritten in one of the three following ways: (i) is a disconnect apply pressure error greater than a threshold, (ii) is a rate of change of the disconnect clutch pressure less than a threshold, or (iii) is a disconnect apply pressure error greater than a first threshold and is a rate of change of the disconnect clutch pressure less than a second threshold.

The disconnect apply pressure error may refer to a difference between (i) the pressure applied to the disconnect clutch 26 according to the feedforward model (e.g., line 202) and (i) the measured pressure of the disconnect clutch 26 (e.g., line 204). A rate of change of the disconnect clutch pressure may be the slope or derivative of either the pressure applied to the disconnect clutch 26 according to the feedforward model or the measured pressure of the disconnect clutch 26. The rate of change of the disconnect clutch pressure is represented by line 208 in FIG. 3. A rate of change or derivative of an apply pressure command to the disconnect clutch 26 is represented by line 210 in FIG. 3. The rate of change or derivative of the apply pressure command to the disconnect clutch 26 may correspond to a feedback control that adjusts the feedforward pressure model (e.g., line 202) based on the disconnect apply pressure error.

If the answer at block 108 is NO, the method 100 moves on to block 106 where the torque of the M/G 18 is controlled based on the non-adjusted torque capacity of the disconnect clutch 26. If the answer at block 108 is YES, the method 100 moves on to block 110, where it is determined if the disconnect clutch 26 has entered into a locked state. If the disconnect clutch 26 has entered into a locked state, the method 100 moves on to block 106 where the torque of the M/G 18 is controlled based on the non-adjusted torque capacity of the disconnect clutch 26. If the disconnect clutch 26 has not entered into a locked state, the method 100 moves on to block 112.

At block 112, the torque of the M/G 18 is controlled based on an adjusted torque capacity of the disconnect clutch 26. The adjusted torque capacity of the disconnect clutch 26 is based on the feedforward model of a pressure applied to the disconnect clutch 26 (e.g., line 202) and an offset value. More specifically, the adjusted torque capacity of the disconnect clutch 26 may be based on the feedforward model of a pressure applied to the disconnect clutch 26 (e.g., line 202) plus the offset value. The M/G 18, for example, may be controlled based on the adjusted torque capacity of the disconnect clutch 26 by limiting a commanded torque to the M/G 18 to the adjusted torque capacity of the disconnect clutch 26 or to an offset value that is less than the adjusted torque capacity of the disconnect clutch 26. The impeller speed is illustrated as line 206 in FIG. 3.

A transfer function, a linear function, exponential function, look up tables, etc. may correlate the values of the feedforward model of a pressure applied to the disconnect clutch 26 plus the offset value to the torque capacity values of the disconnect clutch 26. The feedforward model of the pressure applied to the disconnect clutch 26 plus the offset value is represented by line 212 in FIG. 3. The offset value may be based on the magnitude of the disconnect apply pressure error and/or the magnitude of the rate of change of the disconnect clutch pressure. The offset value may increase as either the disconnect apply pressure error increases or the rate of change of the disconnect clutch pressure decreases. The offset value may decrease as either the disconnect apply pressure error decreases or the rate of change of the disconnect clutch pressure increases. A transfer function, a linear function, exponential function, look up tables, etc. may correlate values of the offset value to the values of the disconnect apply pressure error and/or values of the rate of change of the disconnect clutch pressure. The offset values may be negative, which is illustrated by line 212 having values that are less than lines 202 and 204. The offset values may operate to compensate for a CAN delay between separate controllers or control modules that control the disconnect clutch 26 and the M/G 18.

The ON/OFF state of the offset value is illustrated by line 214 in FIG. 3 with the offset value being turned ON at time $t_1$ and being turned OFF at time $t_2$. While the offset value is turned ON, the torque of the M/G 18 is controlled based on the adjusted torque capacity of the disconnect clutch 26 (e.g., based on the feedforward model of the pressure applied to the disconnect clutch 26 plus the offset value). While the offset value is turned OFF, the torque of the M/G 18 is controlled based on the non-adjusted torque capacity of the disconnect clutch 26 (e.g., based on the feedforward model of the pressure applied to the disconnect clutch 26 and not the offset value).

It should be understood that the flowchart in FIG. 2 is for illustrative purposes only and that the method 100 should not be construed as limited to the flowchart in FIG. 2. Some of the steps of the method 100 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a powertrain having an engine and an electric machine each configured to generate power to propel the vehicle;
   a disconnect clutch (i) disposed between the engine and the electric machine, (ii) configured to open to disconnect the engine from a remainder of the powertrain, and (iii) configured to close to connect the engine to the remainder of the powertrain; and
   a controller programmed to, in response to a command to start the engine,
      close the disconnect clutch to transfer power from the electric machine to the engine to start the engine,
      control a torque capacity of the disconnect clutch during the engine start according to a feedforward model of a pressure applied to the disconnect clutch, and
      control a torque of the electric machine based on an adjusted torque capacity of the disconnect clutch in response to (i) the pressure applied to the disconnect clutch decreasing according to a ramp down phase during the engine start, (ii) a difference between (a) the pressure applied to the disconnect clutch according to the feedforward model and (b) a measured pressure of the disconnect clutch increasing to greater than a first threshold, and (iii) a rate of change of the pressure applied to the disconnect clutch decreasing to less than a second threshold, wherein the adjusted torque capacity of the disconnect clutch is based on the feedforward model of the pressure applied to the disconnect clutch and an offset value.

2. The vehicle of claim 1, wherein the controller is further programmed to, in response to the difference between (i) the pressure applied to the disconnect clutch according to the feedforward model and (ii) the measured pressure of the disconnect decreasing to less than the first threshold, control the torque of the electric machine based on a non-adjusted torque capacity of the disconnect clutch, wherein the non-adjusted torque capacity of the disconnect clutch is based on the feedforward model of the pressure applied to the disconnect clutch and not the offset value.

3. The vehicle of claim 1, wherein the controller is further programmed to, in response to the rate of change of the pressure applied to the disconnect clutch increasing to greater than the second threshold, control the torque of the electric machine based on a non-adjusted torque capacity of the disconnect clutch, wherein the non-adjusted torque capacity of the disconnect clutch is based on the feedforward model of the pressure applied to the disconnect clutch and not the offset value.

4. The vehicle of claim 1, wherein the controller is further programmed to control the torque of the electric machine based on a non-adjusted torque capacity of the disconnect clutch prior to the ramp down phase, wherein the non-adjusted torque capacity of the disconnect clutch is based on the feedforward model of the pressure applied to the disconnect clutch and not the offset value.

5. The vehicle of claim 1, wherein the controller is further programmed to, in response to the disconnect clutch entering a locked state, control the torque of the electric machine based on a non-adjusted torque capacity of the disconnect clutch, wherein the non-adjusted torque capacity of the disconnect clutch is based on the feedforward model of the pressure applied to the disconnect clutch and not the offset value.

6. The vehicle of claim 1, wherein the offset value is negative.

7. A vehicle comprising:
   an engine and an electric machine each configured to generate power to propel the vehicle;
   a clutch disposed between the engine and the electric machine; and
   a controller programmed to, in response to an engine start,
      close the clutch to transfer power from the electric machine to the engine to start the engine,
      control a torque capacity of the clutch during the engine start according to a model of a pressure applied to the clutch, and
      control a torque of the electric machine based on an adjusted torque capacity of the clutch in response to (i) the pressure applied to the clutch decreasing according to a ramp down phase during the engine start and (ii) a difference between (a) the pressure applied to the clutch according to the model and (b) a measured pressure of the clutch increasing to greater than a threshold, wherein the adjusted torque capacity of the clutch is based on the model of the pressure applied to the clutch and an offset value.

8. The vehicle of claim 7, wherein the controller is further programmed to, in response to the difference between (i) the pressure applied to the clutch according to the model and (ii) the measured pressure of the clutch decreasing to less than the threshold, control the torque of the electric machine based on a non-adjusted torque capacity of the clutch, wherein the non-adjusted torque capacity of the clutch is based on the model of the pressure applied to the clutch and not the offset value.

9. The vehicle of claim 7, wherein the controller is further programmed to, in response to the engine start, control the torque of the electric machine based on the adjusted torque capacity of the clutch in response to (i) the pressure applied to the clutch decreasing according to the ramp down phase during the engine start and (ii) a rate of change of the pressure applied to the clutch decreasing to less than a second threshold.

10. The vehicle of claim 9, wherein the controller is further programmed to, in response to the rate of change of the pressure applied to the clutch increasing to greater than the second threshold, control the torque of the electric machine based on a non-adjusted torque capacity of the clutch, wherein the non-adjusted torque capacity of the clutch is based on the model of the pressure applied to the clutch and not the offset value.

11. The vehicle of claim 7, wherein the controller is further programmed to control the torque of the electric machine based on a non-adjusted torque capacity of the clutch prior to the ramp down phase, wherein the non-adjusted torque capacity of the clutch is based on the model of the pressure applied to the clutch and not the offset value.

12. The vehicle of claim 7, wherein the controller is further programmed to, in response to the clutch entering a locked state, control the torque of the electric machine based on a non-adjusted torque capacity of the clutch, wherein the non-adjusted torque capacity of the clutch is based on the model of the pressure applied to the clutch and not the offset value.

13. The vehicle of claim 7, wherein the offset value is negative.

14. A vehicle comprising:
an engine and an electric machine each configured to generate power to propel the vehicle;
a clutch disposed between the engine and the electric machine; and
a controller programmed to, in response to an engine start,
close the clutch to transfer power from the electric machine to the engine to start the engine,
control a torque capacity of the clutch during the engine start according to a model of a pressure applied to the clutch, and
control a torque of the electric machine based on an adjusted torque capacity of the clutch in response to (i) the pressure applied to the clutch decreasing according to a ramp down phase during the engine start and (ii) a rate of change of the pressure applied to the clutch decreasing to less than a threshold, wherein the adjusted torque capacity of the clutch is based on the model of the pressure applied to the clutch and an offset value.

15. The vehicle of claim 14, wherein the controller is further programmed to, in response to the rate of change of the pressure applied to the clutch increasing to greater than the threshold, control the torque of the electric machine based on a non-adjusted torque capacity of the clutch, wherein the non-adjusted torque capacity of the clutch is based on the model of the pressure applied to the clutch and not the offset value.

16. The vehicle of claim 14, wherein the controller is further programmed to, in response to the engine start, control the torque of the electric machine based on the adjusted torque capacity of the clutch in response to (i) the pressure applied to the clutch decreasing according to a ramp down phase during the engine start and (ii) a difference between (a) the pressure applied to the clutch according to the model and (b) a measured pressure of the clutch increasing to greater than a second threshold.

17. The vehicle of claim 16, wherein the controller is further programmed to, in response to the difference between (i) the pressure applied to the clutch according to the model and (ii) the measured pressure of the clutch decreasing to less than the second threshold, control the torque of the electric machine based on a non-adjusted torque capacity of the clutch, wherein the non-adjusted torque capacity of the clutch is based on the model of the pressure applied to the clutch and not the offset value.

18. The vehicle of claim 14, wherein the controller is further programmed to control the torque of the electric machine based on a non-adjusted torque capacity of the clutch prior to the ramp down phase, wherein the non-adjusted torque capacity of the clutch is based on the model of the pressure applied to the clutch and not the offset value.

19. The vehicle of claim 14, wherein the controller is further programmed to, in response to the clutch entering a locked state, control the torque of the electric machine based on a non-adjusted torque capacity of the clutch, wherein the non-adjusted torque capacity of the clutch is based on the model of the pressure applied to the clutch and not the offset value.

20. The vehicle of claim 14, wherein the offset value is negative.

* * * * *